(12) United States Patent
Bryan et al.

(10) Patent No.: US 12,271,864 B2
(45) Date of Patent: Apr. 8, 2025

(54) SYSTEM AND METHOD FOR MANAGEMENT OF PERPETUAL INVENTORY VALUES ASSOCIATED WITH NIL PICKS

(71) Applicant: Walmart Apollo, LLC, Bentonville, AR (US)

(72) Inventors: Greg A. Bryan, Centerton, AR (US); Cristy C. Brooks, Cassville, MO (US); David Blair Brightwell, Bella Vista, AR (US); Benjamin D. Enssle, Bella Vista, AR (US); Matthew A. Jones, Bentonville, AR (US); Jesse L. Eaton, Springdale, AR (US)

(73) Assignee: Walmart Apollo, LLC, Bentonville, AR (US)

( * ) Notice: Subject to any disclaimer, the term of this patent is extended or adjusted under 35 U.S.C. 154(b) by 0 days.

(21) Appl. No.: 18/379,291

(22) Filed: Oct. 12, 2023

(65) Prior Publication Data

US 2024/0046205 A1 Feb. 8, 2024

Related U.S. Application Data

(63) Continuation of application No. 17/111,722, filed on Dec. 4, 2020, now Pat. No. 11,816,628, which is a
(Continued)

(51) Int. Cl.
*G06Q 20/00* (2012.01)
*B64U 10/13* (2023.01)
(Continued)

(52) U.S. Cl.
CPC .......... *G06Q 10/087* (2013.01); *B64U 10/13* (2023.01); *G05D 1/0027* (2013.01);
(Continued)

(58) Field of Classification Search
CPC ..... G06Q 10/08; G06Q 10/087; G05D 1/0027
(Continued)

(56) References Cited

U.S. PATENT DOCUMENTS

| 5,392,382 A | 2/1995 | Schoppers |
| 5,544,282 A | 8/1996 | Chen |

(Continued)

FOREIGN PATENT DOCUMENTS

| CA | 2682886 | 4/2010 |
| CN | 204270352 U | 4/2015 |

(Continued)

OTHER PUBLICATIONS

"Improve Productivity and Customer Service in the Retail Store With Automated Inventory Management: The MC2100 in retail"; Zebra Technologies; Apr. 2015; pp. 1-6.
(Continued)

*Primary Examiner* — Rokib Masud
(74) *Attorney, Agent, or Firm* — Fitch, Even, Tabin & Flannery LLP

(57) ABSTRACT

An electronic indication of a nil pick is received. Item information associated with the desired product, sales data concerning the desired product, supply chain information associated with the desired product, and a perpetual inventory (PI) value of the desired product are stored. An adjustment to the PI of the desired product is blocked when a predetermined event occurs at the retail store, or when information that contradicts the validity of the nil pick is received from the retail store. When the adjustment to the PI of the desired product is not blocked, an amount of the adjustment is determined based upon one or more of: the item information associated with the product, the sales data concerning the product, and the supply chain information associated with the desired product.

18 Claims, 5 Drawing Sheets

Related U.S. Application Data continuation of application No. 15/914,763, filed on Mar. 7, 2018, now abandoned.

(60) Provisional application No. 62/471,412, filed on Mar. 15, 2017.

(51) Int. Cl.
| | | |
|---|---|---|
| *G05D 1/00* | (2006.01) | |
| *G06Q 10/08* | (2023.01) | |
| *G06Q 10/087* | (2023.01) | |
| *B64U 101/00* | (2023.01) | |

(52) U.S. Cl.
CPC ........... *G05D 1/0276* (2013.01); *G06Q 10/08* (2013.01); *B64U 2101/00* (2023.01); *B64U 2201/10* (2023.01)

(58) Field of Classification Search
USPC ............................................................ 705/28
See application file for complete search history.

(56) References Cited

U.S. PATENT DOCUMENTS

| | | | |
|---|---|---|---|
| 5,963,919 | A | 10/1999 | Brinkley |
| 6,681,990 | B2 | 1/2004 | Vogler |
| 6,726,099 | B2 | 4/2004 | Becker |
| 6,758,403 | B1 | 7/2004 | Keys |
| 6,876,991 | B1 | 4/2005 | Owen |
| 6,889,165 | B2 | 5/2005 | Lind |
| 7,084,769 | B2 | 8/2006 | Bauer |
| 7,222,786 | B2 | 5/2007 | Renz |
| 7,370,005 | B1 | 5/2008 | Ham |
| 7,401,057 | B2 | 7/2008 | Eder |
| 7,480,623 | B1 | 1/2009 | Landvater |
| 7,523,065 | B2 | 4/2009 | Eder |
| 7,552,066 | B1 | 6/2009 | Landvater |
| 7,580,848 | B2 | 8/2009 | Eder |
| 7,616,117 | B2 | 11/2009 | Streeb |
| 7,693,757 | B2 | 4/2010 | Zimmerman |
| 7,788,119 | B2 | 8/2010 | Najmi |
| 7,792,709 | B1 | 9/2010 | Trandal |
| 7,950,579 | B2 | 5/2011 | Gray |
| 7,954,712 | B2 | 6/2011 | Babcock |
| 8,091,782 | B2 | 1/2012 | Cato |
| 8,107,736 | B2 | 1/2012 | Brown |
| 8,189,855 | B2 | 5/2012 | Opalach |
| 8,191,672 | B2 | 6/2012 | Kondo |
| 8,195,533 | B1 | 6/2012 | Mishra |
| 8,224,717 | B2 | 7/2012 | Giacobbe |
| 8,260,456 | B2 | 9/2012 | Siegel |
| 8,321,302 | B2 | 11/2012 | Bauer |
| 8,321,303 | B1 | 11/2012 | Krishnamurthy |
| 8,346,630 | B1 | 1/2013 | McKeown |
| 8,423,431 | B1 | 4/2013 | Rouaix |
| 8,521,620 | B2 | 8/2013 | Livingston |
| 8,577,136 | B1 | 11/2013 | Ascher |
| 8,616,822 | B2 | 12/2013 | Winkler |
| 8,732,039 | B1 | 5/2014 | Chen |
| 8,965,796 | B1 | 2/2015 | Gala |
| 9,120,622 | B1 | 9/2015 | Elazary |
| 9,165,277 | B2 | 10/2015 | Jones |
| 9,171,278 | B1 | 10/2015 | Kong |
| 9,205,886 | B1 | 12/2015 | Hickman |
| 9,280,757 | B2 | 3/2016 | Parpia |
| 9,378,484 | B1 | 6/2016 | Russell |
| 9,415,935 | B1 | 8/2016 | MacFarlane |
| 9,758,301 | B2 | 9/2017 | Porat |
| 10,019,803 | B2 | 7/2018 | Venable |
| 10,089,055 | B1 | 10/2018 | Fryman |
| 10,130,177 | B2 | 11/2018 | Jones |
| 10,130,232 | B2 | 11/2018 | Atchley |
| 10,138,060 | B1 | 11/2018 | Mantha |
| 10,169,738 | B2 | 1/2019 | Jones |
| 10,189,642 | B2 | 1/2019 | High |
| 10,192,157 | B2 | 1/2019 | Cote |
| 10,289,990 | B2 | 5/2019 | Rizzolo |
| 10,311,400 | B2 | 6/2019 | Mascorro Medina |
| 10,360,548 | B2 | 7/2019 | Brooks |
| 10,373,116 | B2 | 8/2019 | Medina |
| 10,453,009 | B2 | 10/2019 | Ulrich |
| 10,467,587 | B2 | 11/2019 | Bogolea |
| 10,489,677 | B2 | 11/2019 | Rzeszutek |
| 10,505,057 | B2 | 12/2019 | Haist |
| 10,546,258 | B2 | 1/2020 | Jones |
| 10,552,792 | B2 | 2/2020 | Mattingly |
| 10,558,947 | B2 | 2/2020 | Bryan |
| 10,997,552 | B2 | 5/2021 | Bryan |
| 11,055,662 | B2 | 7/2021 | Bryan |
| 11,282,157 | B2 | 3/2022 | Bryan |
| 11,449,828 | B2 | 9/2022 | Bryan |
| 11,501,251 | B2 | 11/2022 | Bryan |
| 11,715,066 | B2 | 8/2023 | Bryan |
| 11,797,929 | B2 | 10/2023 | Bryan |
| 11,816,628 | B2 | 11/2023 | Bryan |
| 11,868,960 | B2 | 1/2024 | Bryan |
| 2001/0047293 | A1 | 11/2001 | Waller |
| 2002/0138336 | A1 | 9/2002 | Bakes |
| 2002/0174001 | A1 | 11/2002 | Henry |
| 2003/0216969 | A1 | 11/2003 | Bauer |
| 2003/0233277 | A1 | 12/2003 | Saunders |
| 2004/0158507 | A1 | 8/2004 | Meek |
| 2006/0157150 | A1 | 7/2006 | Blakeslee |
| 2006/0184511 | A1 | 8/2006 | Koo |
| 2007/0021864 | A1 | 1/2007 | Mountz |
| 2007/0144991 | A1 | 6/2007 | Hansl |
| 2007/0288439 | A1 | 12/2007 | Rappaport |
| 2008/0077510 | A1 | 3/2008 | Dielemans |
| 2008/0114651 | A1 | 5/2008 | Jain |
| 2008/0120205 | A1 | 5/2008 | Hoopes |
| 2008/0140491 | A1 | 6/2008 | Jain |
| 2008/0255968 | A1 | 10/2008 | Heinrichs |
| 2008/0270269 | A1 | 10/2008 | Myers |
| 2008/0288595 | A1 | 11/2008 | Liu |
| 2009/0060349 | A1 | 3/2009 | Linaker |
| 2009/0063310 | A1 | 3/2009 | Alonzo |
| 2009/0101713 | A1 | 4/2009 | Ulrich |
| 2009/0157533 | A1 | 6/2009 | Ohno |
| 2010/0023459 | A1 | 1/2010 | Sundby |
| 2010/0095269 | A1 | 4/2010 | Bouillet |
| 2010/0106609 | A1 | 4/2010 | Sherman |
| 2010/0138037 | A1 | 6/2010 | Adelberg |
| 2011/0093418 | A1 | 4/2011 | Kwok |
| 2011/0131557 | A1 | 6/2011 | Bouillet |
| 2012/0209734 | A1 | 8/2012 | Brooks |
| 2012/0259655 | A1 | 10/2012 | Madreperla |
| 2012/0310781 | A1* | 12/2012 | Battle ................... G06Q 40/00 705/26.63 |
| 2013/0018696 | A1 | 1/2013 | Meldrum |
| 2013/0124189 | A1 | 5/2013 | Baldwin |
| 2013/0211870 | A1 | 8/2013 | Lawson |
| 2014/0006131 | A1 | 1/2014 | Causey |
| 2014/0006229 | A1 | 1/2014 | Birch |
| 2014/0067634 | A1 | 3/2014 | Sowder |
| 2014/0100769 | A1 | 4/2014 | Wurman |
| 2014/0101088 | A1 | 4/2014 | Hall |
| 2014/0122391 | A1 | 5/2014 | Mugan |
| 2014/0143039 | A1 | 5/2014 | Branton |
| 2014/0180865 | A1* | 6/2014 | Argue ................ G06Q 30/0633 705/26.7 |
| 2014/0201042 | A1 | 7/2014 | Meyer |
| 2014/0247116 | A1 | 9/2014 | Davidson |
| 2014/0344118 | A1 | 11/2014 | Parpia |
| 2014/0379535 | A1 | 12/2014 | Briet |
| 2015/0039373 | A1 | 2/2015 | Anand |
| 2015/0154256 | A1 | 6/2015 | McKenna |
| 2015/0178654 | A1 | 6/2015 | Glasgow |
| 2015/0235157 | A1 | 8/2015 | Avegliano |
| 2015/0242805 | A1* | 8/2015 | Sakurai .................. G06Q 30/00 705/28 |
| 2015/0379366 | A1 | 12/2015 | Nomura |
| 2016/0042315 | A1 | 2/2016 | Field-Darragh |
| 2016/0114488 | A1 | 4/2016 | Mascorro Medina |
| 2016/0132823 | A1 | 5/2016 | Swafford |

(56) References Cited

U.S. PATENT DOCUMENTS

| | | | |
|---|---|---|---|
| 2016/0132910 A1* | 5/2016 | Appel | G06Q 30/0202 705/7.31 |
| 2016/0171428 A1 | 6/2016 | Gooijer | |
| 2016/0371613 A1 | 12/2016 | Ulrich | |
| 2017/0148005 A1 | 5/2017 | Murn | |
| 2017/0155788 A1 | 6/2017 | Kobayashi | |
| 2017/0193430 A1 | 7/2017 | Barreira Avegliano | |
| 2017/0200106 A1 | 7/2017 | Jones | |
| 2017/0277863 A1 | 9/2017 | Subra | |
| 2017/0287038 A1 | 10/2017 | Krasadakis | |
| 2018/0005174 A1 | 1/2018 | Dixon | |
| 2018/0060804 A1 | 3/2018 | Cheruku | |
| 2018/0089613 A1 | 3/2018 | Chen | |
| 2018/0152884 A1 | 5/2018 | Hu | |
| 2018/0268355 A1 | 9/2018 | Bryan | |
| 2018/0268356 A1 | 9/2018 | Bryan | |
| 2018/0268364 A1 | 9/2018 | Bryan | |
| 2018/0268365 A1 | 9/2018 | Bryan | |
| 2018/0268366 A1 | 9/2018 | Bryan | |
| 2018/0268367 A1 | 9/2018 | Bryan | |
| 2018/0268509 A1 | 9/2018 | Bryan | |
| 2018/0341906 A1 | 11/2018 | Bryan | |
| 2019/0057449 A1 | 2/2019 | Berd | |
| 2019/0073775 A1 | 3/2019 | Lam | |
| 2019/0149725 A1 | 5/2019 | Adato | |
| 2019/0156821 A1 | 5/2019 | Zamora Duran | |
| 2019/0215424 A1 | 7/2019 | Adato | |
| 2019/0291954 A1 | 9/2019 | Lee | |
| 2019/0303863 A1 | 10/2019 | Ghosh | |
| 2020/0342561 A1 | 10/2020 | Bryan | |
| 2020/0349499 A1 | 11/2020 | Bryan | |
| 2021/0056506 A1 | 2/2021 | Bryan | |
| 2021/0090015 A1 | 3/2021 | Bryan | |
| 2021/0201255 A1 | 7/2021 | Bryan | |
| 2021/0264360 A1 | 8/2021 | Bryan | |
| 2021/0295253 A1 | 9/2021 | Bryan | |
| 2023/0334422 A1 | 10/2023 | Bryan | |
| 2024/0013148 A1 | 1/2024 | Bryan | |
| 2024/0095672 A1 | 3/2024 | Bryan | |

FOREIGN PATENT DOCUMENTS

| | | |
|---|---|---|
| EP | 1901215 | 3/2008 |
| WO | 2015184286 | 12/2015 |
| WO | 2016109251 | 7/2016 |

OTHER PUBLICATIONS

"Shelf Monitor"; Tech Mahindra; https://www.techmahindra.com/industries/Enterprise/retail_and_cpg/retail/solutions/shelf_monitor.aspx; 2016; pp. 1-1.

Angell, Robert C., "Control of State-Wide Liquor Inventories", National Association of Cost Accountants; NACA Bulletin (pre-1986); Feb. 15, 1948; pp. 1-9.

Bourzac, Katherine; "A Robot Takes Stock"; https://www.technologyreview.com/s/428374/arobottakesstock/; Published Jun. 29, 2012; pp. 1-4.

Fraunhofer; "The flying inventory assistant"; http://www.fraunhofer.de/en/press/research-news/2014/december/the-flying-inventoryassistant.html; Published Dec. 1, 2014; pp. 1-3.

Gruen, Thomas W., et al.; "A Comprehensive Guide to Retail Out-of-Stock Reduction in the Fast-Moving Consumer Goods Industry"; 2007; 71 pgs.

Kang, Yun, et al.; "Information Inaccuracy in Inventory Systems—Stock Loss and Stockout"; Massachusetts Institute of Technology; Published Aug. 23, 2004; 29 pages.

Lowe's Home Improvement; "Lowe's Introduces LoweBot"; https://www.youtube.com/watch?v=hP3yfGHTXFo; Published on Aug. 30, 2016; pp. 1-10.

McClain, John O; Cornell University; "Simulating Inventory Control with Orders that Cross during Lead Time"; http://www.exinfm.com/excel%20files/Inventory_Simulation.xls; Mar. 22, 2002; pp. 1-60.

Moyer, Ted; TotalRetail; "5 Steps to Solving the Out-of-Stock Problem"; http://www.mytotalretail.com/article/5stepstosolvingtheoutofstockproblem/; Published Apr. 19, 2016; pp. 1-7.

SAP; "How to Set up and Manage a Perpetual Inventory System"; SAP; Jun. 22, 2016; pp. 1-108.

Stuart, Sophia; "Meet Tally, the Robot That Knows What's on Store Shelves"; http://in.pcmag.com/roboticsautomation/99587/news/meettallytherobotthatknowswhatsonstoreshelves; Published Jan. 27, 2016; pp. 1-8.

Trujillo, Paul; "Walmart is Addressing Inventory Problems With a New System"; http://www.waspbarcode.com/buzz/walmart-2/; Nov. 15, 2016; pp. 1-7.

Vanian, Jonathan; "Target's New Robot Helper Is Busy at Work on Aisle 3"; http://fortune.com/2016/04/28/targettestingrobotinventorysimbe/; Published Apr. 28, 2016; pp. 1-8.

Wharton School; "Robot Assistants in Aisle 10: Will Shoppers Buy It?"; http://knowledge.wharton.upenn.edu/article/robots-aisle-10-will-shoppers-like/; Published Sep. 7, 2016; pp. 1-5.

* cited by examiner

SYSTEM AND METHOD FOR MANAGEMENT OF PERPETUAL INVENTORY VALUES ASSOCIATED WITH NIL PICKS

CROSS-REFERENCE TO RELATED APPLICATIONS

This application is a continuation of U.S. application Ser. No. 17/111,722, filed Dec. 4, 2020, which is a continuation of U.S. application Ser. No. 15/914,763, filed Mar. 7, 2018, which claims the benefit of U.S. Provisional Application No. 62/471,412, filed Mar. 15, 2017, all of which are incorporated herein by reference in their entireties.

TECHNICAL FIELD

This invention relates generally to the management of perpetual inventory values, and more particularly, to the management of perpetual inventory values when a nil pick occurs.

BACKGROUND

Various approaches and values are utilized to track the exact amount of products present in a retail store. Among other things, the amount of a product that is available in the store may be used in determining when to re-order the product from a supplier, and the popularity of the product.

Perpetual inventory (PI) values are one type of indicator used to track product availability. PI values generally relate to the amount of a selected product available at a retail store.

Sometimes, PI values become inaccurate. Incorrect PI values can lead to inefficient operation of the store. For instance, an item may need to be retrieved in the store. A store employee (or autonomous vehicle) may be asked to find an item to satisfy a customer requests based on a PI value that indicates that product is present in the store. However, in some situations, a "nil pick" occurs when the item is not located even though the PI value indicates product availability. Nil picks waste system resources and contribute to the inefficient operation of retail stores.

BRIEF DESCRIPTION OF THE DRAWINGS

Disclosed herein are embodiments of systems, apparatuses and methods pertaining to managing perpetual inventory values. This description includes drawings, wherein.

Figure 1:
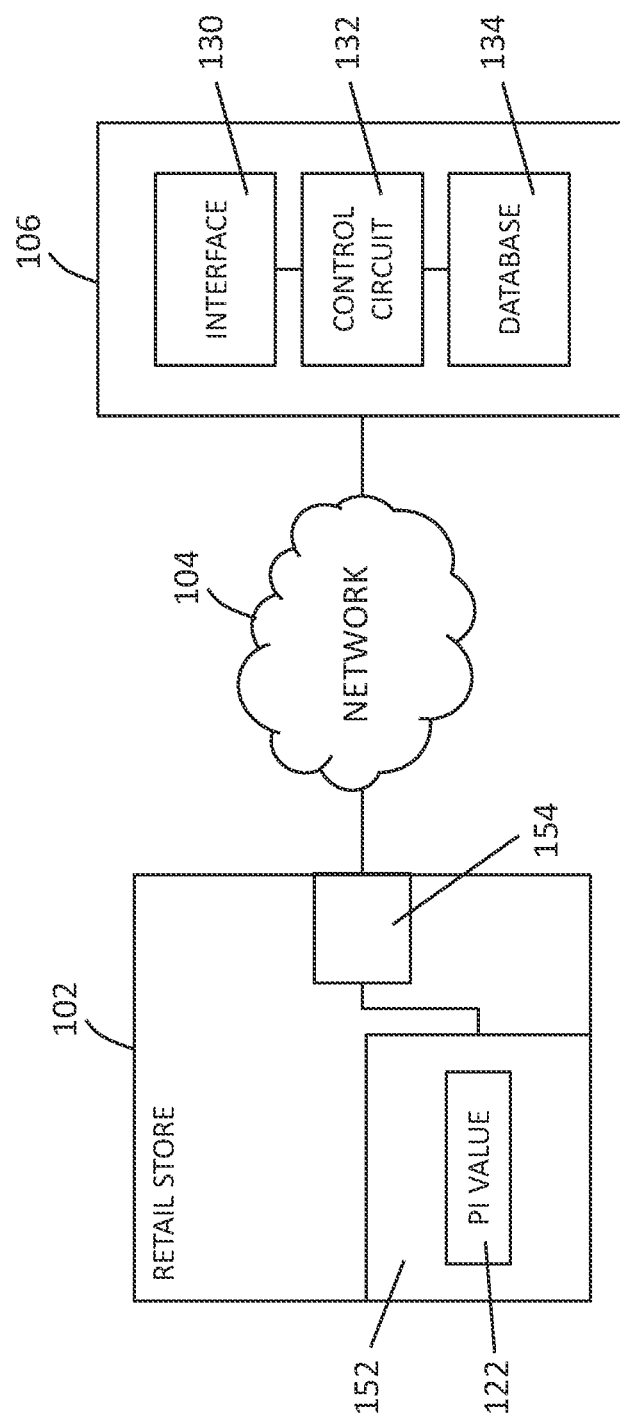
FIG. 1 is a block diagram showing one example of a system that adjusts the PI of a product after a nil pick in accordance with some embodiments.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

Generally speaking, systems, apparatuses and methods are provided that adjust perpetual inventory values when a nil pick occurs with a high degree of confidence that the adjustment is correct. Advantageously, PI adjustments are blocked when, for example, there is an on-going audit at the store, or when the back room value of the product indicates there is product in the back room. The adjustment may also be calculated in a way that increases the confidence level for the adjustment.

In some of these embodiments, a system that is configured to manage the occurrence of nil picks in a retail store includes an interface, a database, and a control circuit. The interface is configured to receive an electronic indication of a nil pick. The nil pick occurs when an employee or automated vehicle fails to find a desired product in the retail store. The database stores item information associated with the desired product, sales data concerning the desired product, and supply chain information associated with the desired product. The database also stores a perpetual inventory (PI) value of the desired product. The control circuit is coupled to the interface and the database, and is configured to block an adjustment to the PI of the desired product when a predetermined event occurs at the retail store, or when information that contradicts the validity of the nil pick is received from the retail store. When the adjustment to the PI of the desired product is not blocked, the control circuit is configured to determine the adjustment based upon one or more factors including the item information associated with the product, the sales data concerning the product, and/or the supply chain information associated with the desired product.

In aspects, the control circuit is configured to transmit the adjustment to the retail store. The retail store may then make the adjustment to the PI.

In other examples, the item information associated with the product may be the cost of the product, physical characteristics of the product, a size of a warehouse pack that includes the product, and/or the size of a case pack that includes the product. Other examples of item information are possible.

In yet other examples, the sales data concerning the product includes information such as the amount of the product that has been sold, and/or when the product was sold. Other examples of sales data are possible.

In still other examples, the supply chain information may include information such as delivery dates for the product, and/or an amount of the product delivered on the delivery dates. Other examples of supply chain information are possible.

In aspects, the predetermined event is an event such as an inventory audit at the retail store, or a lack of sales scan for the product within a predetermined time. Other examples of predetermined events are possible.

In still other aspects, information that contradicts the validity of the nil pick may be data such as a back room inventory value that indicates the product exists in a back room of the retail store, and a message from the store indicating the store is aware of the nil pick. Other examples are possible.

In yet other examples, the control circuit transmits an alert to a store employee when the adjustment to the PI is made. The employee may take appropriate actions after receiving the alert.

In still other examples, the system further includes a robot, and the robot is operated to verify the occurrence of the nil pick. For example, the robot may verify that there is none of the product in the store.

It will be appreciated that the system may be deployed at a location such as some central location (e.g., a home office) or at a retail store. The system may be deployed at other locations as well.

In others of these embodiments, an electronic indication of a nil pick is received. The nil pick occurs when an employee or automated vehicle fails to find a desired product in the retail store. Item information associated with the desired product, sales data concerning the desired product, supply chain information associated with the desired product, and a perpetual inventory (PI) value of the desired product are stored, for example, in a database. An adjustment to the PI of the desired product is blocked when a predetermined event occurs at the retail store, or when information that contradicts the validity of the nil pick is received from the retail store. When the adjustment to the PI of the desired product is not blocked, an amount of the adjustment is determined based upon the item information associated with the product, the sales data concerning the product, and/or the supply chain information associated with the desired product.

In still others of these embodiments, a system is configured to manage the occurrence of nil picks in a retail store, the system. The system includes an automated vehicle, one or more sales entry devices, a transceiver circuit, a network, an interface, a database, and a control circuit.

The automated vehicle is disposed at a retail store and is configured to generate an indication of a nil pick. The nil pick occurs when the automated vehicle fails to find a desired product in the retail store. The one or more sales entry devices are disposed at the retail store.

The transceiver circuit is disposed at the retail store and is coupled to the automated vehicle and the sales entry devices. The network is coupled to the transceiver circuit.

The interface is disposed at a central processing center and coupled to the network. The interface is configured to receive the electronic indication of the nil pick.

The database is disposed at a central processing center and stores item information associated with the desired product, sales data concerning the desired product obtained from the sales entry devices, supply chain information associated with the desired product, and a perpetual inventory (PI) value of the desired product.

The control circuit is disposed at a central processing center and is coupled to the interface and the database. The control circuit is configured to block an adjustment to the PI of the desired product when a predetermined event occurs at the retail store, or when information that contradicts the validity of the nil pick is received from the retail store or from other retail stores. The control circuit if further configured to, when the adjustment to the PI of the desired product is not blocked, determine the adjustment based upon one or more of: the item information associated with the product, the sales data concerning the product at the retail store, the supply chain information associated with the desired product, and sales data concerning the desired product at other retail stores. The control circuit is configured to transmit the adjustment or an adjusted PI to the transceiver at the retail store.

Referring now to FIG. 1, one example of a system 100 for adjusting the PI value of a selected product in a retail store 102 is described. The retail store 102 may be any type of retail store, for example, a discount center, a grocery store, a department store, or a hardware store to mention a few examples.

The retail store includes a database 152 that stores for each product a PI value 122. The PI value 122 for the selected product indicates the amount of a selected product in the retail store. The PI value 122 is used for various purposes by the retail store 102 such as determining when to reorder products from a warehouse or other supplier.

A communication device 154 allows the retail store 102 to communicate with devices and entities that are external to the store. The communication device 154 may include any combination of hardware or software that allows communications to be received at the retail store 102, and makes transmissions from the retail store 102. In one example, the communication device 154 may be a transceiver circuit. The communication device 154 may be deployed within or at another device (e.g., a modem, a smart phone, or a personal computer, to mention a few examples).

Cloud network 104 is coupled to the communication device 154 (e.g., a transceiver) at the retail store 102. The cloud network 104 may be any type of computer or communication network and may include routers, gateways, and servers to mention a few examples of devices that can form or be utilized in the network 104. The cloud network 104 may also be combinations of various types of networks.

An apparatus 106 includes an interface 130, a control circuit 132, and a database 134. The interface 130 is configured to receive from the retail store 102 the perpetual inventory (PI) value 122 associated with the selected product. The database 134 stores the PI value 122. Alternatively, the apparatus 106 may calculate the PI value 122 and store the result in the database 134. In aspects, the apparatus 106 may be disposed at a central processing center or location such as a business headquarters. In other examples, the apparatus 106 is disposed at one or more remote locations (e.g., retail stores). Advantageously, disposing the apparatus at a central processing center reduces data storage cost, since all data can be stored at a single location instead of at multiple locations. Consequently, the PI value may be calculated remotely at the retail store 102 or at the central processing center.

The control circuit 132 is coupled to the interface 130 and the database 134. The control circuit 132 is configured to obtain the PI value 122 from the database 134. It will be appreciated that as used herein the term "control circuit" refers broadly to any microcontroller, computer, or processor-based device with processor, memory, and programmable input/output peripherals, which is generally designed to govern the operation of other components and devices. It is further understood to include common accompanying accessory devices, including memory, transceivers for communication with other components and devices, etc. These architectural options are well known and understood in the art and require no further description here. The control circuit 132 may be configured (for example, by using corresponding programming stored in a memory as will be well understood by those skilled in the art) to carry out one or more of the steps, actions, and/or functions described herein.

The control circuit 132 is coupled to the interface 130 and the database 134 and is configured to block an adjustment to the PI of a desired product when a predetermined event occurs at the retail store 102, or when information that contradicts the validity of the nil pick is received from the retail store 102. When the adjustment to the PI of the desired product is not blocked, the control circuit 132 is configured to determine the adjustment to the PI based upon the item information associated with the product, the sales data concerning the product, and/or the supply chain information associated with the desired product. In other aspects, the control circuit 132 is configured to transmit the adjustment (or the adjusted PI value) to the retail store 102.

In some examples, the item information associated with the product may be the cost of the product, physical characteristics of the product, a size of a warehouse pack that includes the product, or the size of a case pack that includes the product. Other examples of item information are possible. The item information may be stored in the database 134. In examples, the item information may be received electronically from a manufacturer (e.g., via the network 104), or from the retail store 102.

In aspects, the sales data concerning the product includes information such as an amount of the product sold, or when the product was sold. Other examples of sales data are possible. The sales data may be stored in the database 134. The sales data may be obtained from sales entry devices disposed at the retail store 102 and may be received at the apparatus 106, which may be disposed at a central processing center.

In other examples, the supply chain information includes information such as delivery dates for the product, or an amount of the product delivered on the delivery dates. Other examples are possible. The supply chain information may be stored in the database 134. In aspects, the supply chain information may be obtained from the manufacturer of the product, or from the retail store 102 and may be received at the apparatus 106, which may be disposed at a central processing center.

In other aspects, the predetermined event is an event such as an inventory audit at the retail store, or the lack of a sales scan being made for the product within a predetermined time period. Other examples of predetermined events are possible. This information may be stored in the database 134. In aspects, the information concerning the predetermined event may be obtained from another entity (e.g., the manufacturer of the product or a central headquarters), or from the retail store 102 and may be received at the apparatus 106, which may be disposed at a central processing center. Various devices (e.g., sales entry devices or sensors) can be used to collect this information.

In still other aspects, information that contradicts the validity of the nil pick may be data such as a back room inventory value that indicates the product exists in a back room of the retail store, or a message from the store indicating that the store is aware of the nil pick. In these cases, the nil pick (PI value is 0) is contradicted by information that indicates the PI value is not 0. The back room of the retail store may be a room or other space that is not accessible to customers. This information may also be stored in the database 134. The backroom information may be a numerical value sent from the retail store 102, or may be scans (e.g., obtained by sensors such as cameras) of the backroom sent from the retail store 102 and that are analyzed by the apparatus 106 to determine the backroom inventory value.

Information may be also received at the control circuit 132 as to whether the PI was blocked at other retail stores or otherwise contradicts the validity of the nil pick (indicating the PI value should not be changed). For example, another store (or a predetermined number of other stores) may be under audit indicating that changes to the PI value at the present store should be blocked. This information may also be stored in the database 134. Information that contradicts the validity of the nil pick may be received at the apparatus 106 (when the apparatus is disposed at a central processing center) from the retail store 102, and/or from other retail stores.

If an adjustment to the PI is made, various additional actions can be taken. In some examples, the control circuit 132 transmits an alert to a store employee when the adjustment to the PI is made. Automated devices can also be utilized in a variety of different ways. For instance, the system may also include a robot, and the robot is operated to verify the occurrence of the nil pick.

As mentioned, the system 100 may be deployed at a variety of locations. For instance, the system 100 may be deployed at a central location (e.g., such as at a home or central office), or at the retail store. Other examples of deployment locations are possible.

Figure 2:
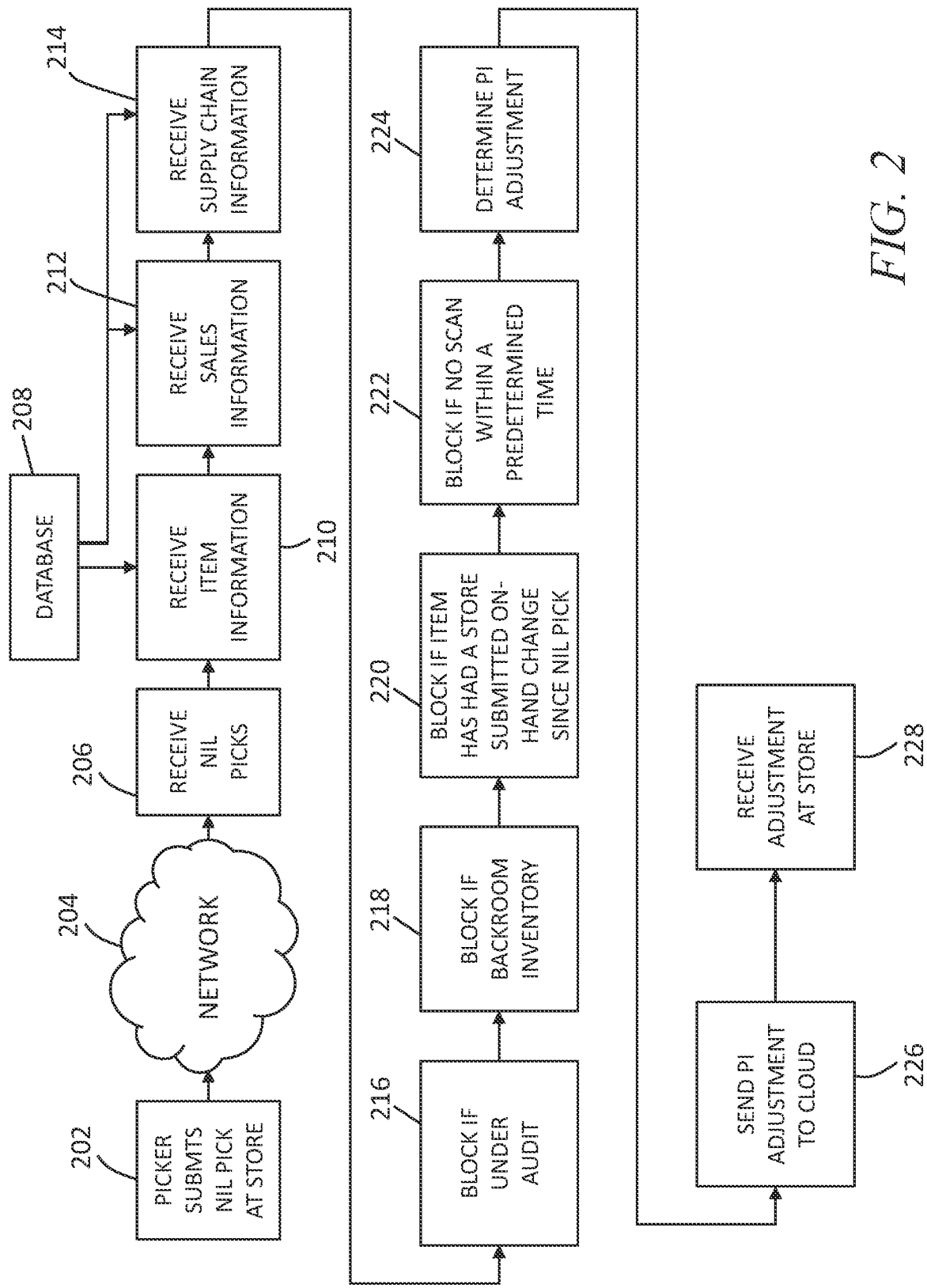
FIG. 2 is a flowchart showing one example of an approach for adjusting the PI of a selected product after a nil pick in accordance with some embodiments.

Referring now to FIG. 2, one example of an approach for adjusting the PI value after a nil pick is described. In this example, it is assumed that data is gathered at the retail store and sent to a central processing center for the determination of PI adjustments. However, in other examples, all processing may occur at the retail store. At step 202, a nil pick occurs at a retail store and an indication of the nil pick is created. A nil pick occurs when a picker (e.g., a human or an automated vehicle) attempts to find an item at a location, but the item is not at the location. The indication of the nil pick is sent over a network (e.g., the cloud) 204 from the retail store to a central processing center, in one example.

At step 206, the system (e.g., the central processing center) receives the indication of the nil pick. The indication may be an electronic indication. In some examples, the indication is entered into an electronic device by an employee that attempts, but fails to find the product. In other examples, the indication is created by an automated vehicle (e.g., an automated ground vehicle or aerial drone) that attempts, but fails to find the product.

At step 210, item information is received from a database 208. In examples, the item information associated with the product may be the cost of the product, physical characteristics of the product, a size of a warehouse pack that includes the product, or the size of a case pack that includes the product. In aspects, the database 208 may be disposed at the central processing center.

At step 212, sales information is received from the database 208. In examples, the sales data concerning the product includes information such as an amount of the product sold, or when the product was sold. The sales information may be collected by sales entry devices (e.g., scanners, sensors, cash registers) at the retail store and sent to the central processing center.

At step 214, supply chain information is received from the database 208. In examples, the supply chain information includes information such as delivery dates for the product, or an amount of the product delivered on the delivery dates.

The supply chain information may be received at the central processing center from, for example, a product manufacturer, supplier, retail store, and/or delivery service.

At step 216, a PI adjustment is blocked if the store is under audit. By "audit," it is meant an inspection or verification of the accounts, inventory, and/or records of the retail store. At step 218, the PI adjustment is blocked if back room inventory of the product exists.

At step 220, the PI adjustment is blocked if the store submitted a change to the PI (on-hand inventory) since the nil pick occurred. At step 222, the PI adjustment is blocked if there has been no scan of the product within a predetermined time. The scan may be a visual scan of the product, or a scan of a tag on the product (e.g., an RFID tag). Information may be also received as to whether the PI was blocked at other retail stores or otherwise contradicts the validity of the nil pick (indicating the PI value should not be changed). For example, another store (or a predetermined number of other stores may be under audit indicating that changes to the PI value at the present store should be blocked.

At step 224, the PI adjustment is determined. Various approaches can be used to determine the adjustment. Item information, sales information, and/or supply chain information can be considered. The importance of the individual pieces of the information in making the adjustment can be weighted. To take one example, if all information indicates that there is no product in the store, then the adjustment is a value that (when subtracted from the PI) results in a 0 value for the PI. In other examples, the adjusted PI value is also determined. In still other aspects, sales data concerning the desired product at other retail stores can be considered. For example, when the PI value is adjusted to 0 at other stores under similar circumstances, then the PI value might be adjusted to 0 as well.

At step 226, the PI adjustment is sent to the cloud (or to another network). At step 228, the PI adjustment is received at the store via the cloud (or other network). The PI adjustment can then be applied to the PI of the product at the retail store. In other examples and as mentioned, the adjusted PI value (rather than the adjustment) is sent to the retail store. The store may then use an adjusted PI, for example, for various purposes such as re-ordering products.

Figure 3:
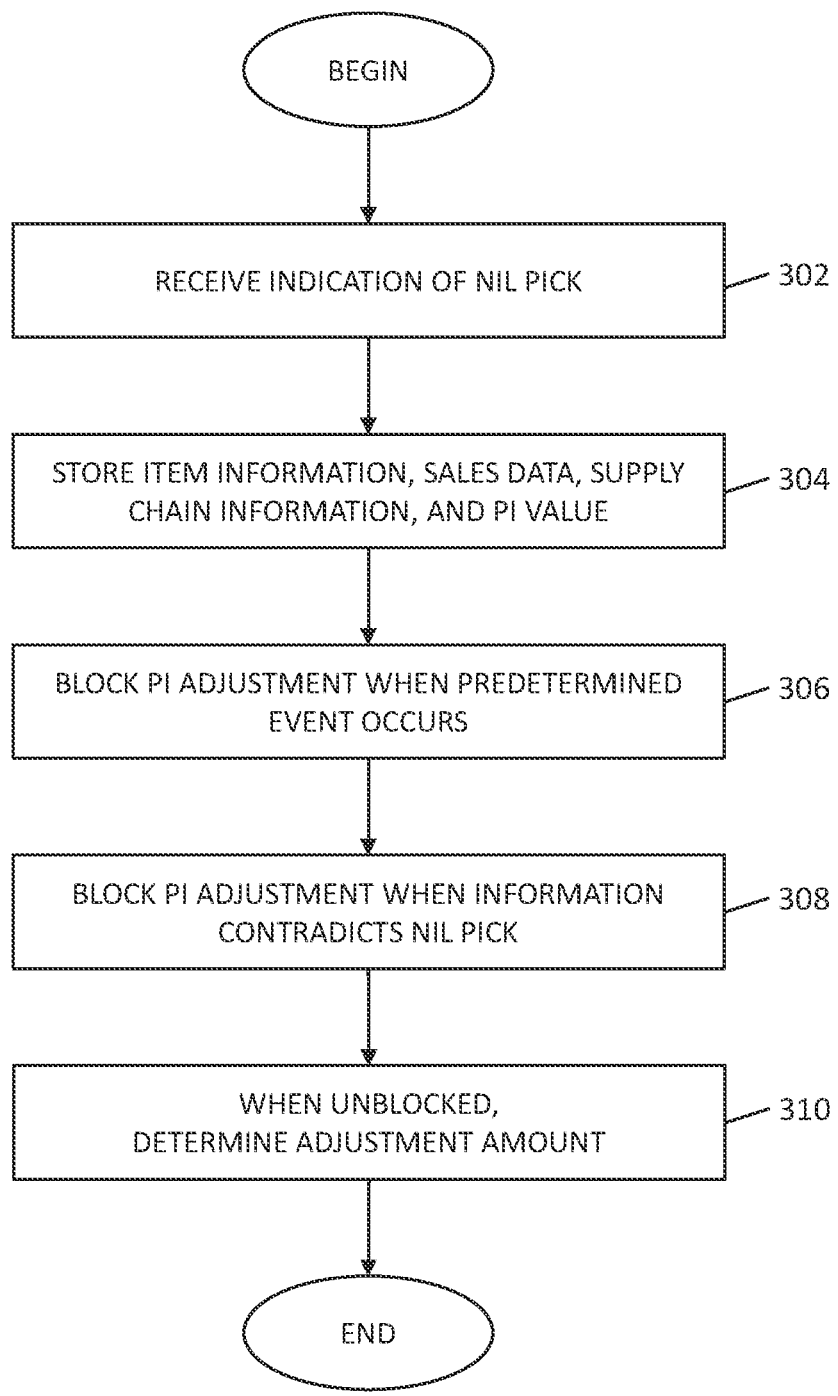
FIG. 3 is a flowchart showing another example of an approach for adjusting the PI of a selected product after a nil pick in accordance with some embodiments.

Referring now to FIG. 3, one example of an approach for adjusting the PI value for a nil pick is described. At step 302, an indication of a nil pick is received. The indication may be an electronic indication. In some examples, the indication is entered into an electronic device (e.g., smart phone, tablet, laptop or personal computer) by an employee that attempts, but fails to find the product. In other examples, the indication is created by an automated vehicle (e.g., an automated ground vehicle or aerial drone) that attempts, but fails to find the product.

At step 304, item information associated with the desired product, sales data concerning the desired product, supply chain information associated with the desired product, and a perpetual inventory (PI) value of the desired product are received and stored. Item information may include the cost of the product, physical characteristics of the product, a size of a warehouse pack that includes the product, or the size of a case pack that includes the product. Sales data may include product information such as an amount of the product sold, or when the product was sold. Supply chain information may include information such as delivery dates for the product, or an amount of the product delivered on the delivery dates.

At step 306, an adjustment to the PI of the desired product is blocked when a predetermined event occurs at the retail store. In examples, the predetermined event is an event such as an inventory audit at the retail store, or a lack of sales scan for the product within a predetermined time.

At step 308, an adjustment to the PI of the desired product is blocked when information that contradicts the validity of the nil pick is received from the retail store. Information that contradicts the validity of the nil pick is any information that suggests or validates that the product is present somewhere in the store. This information may include data such as a back room inventory value that indicates the product exists in a back room of the retail store, or a message from the store indicating the store is aware of the nil pick.

At step 310, when the adjustment to the PI of the desired product is not blocked, an amount of the adjustment is determined based upon the item information associated with the product, the sales data concerning the product, and/or the supply chain information associated with the desired product.

One example of an approach for determining the magnitude (and/or sign) of the adjustment is described below with respect to FIG. 4. In aspects, the approach of FIG. 4 may be performed at a central processing center. However, in other aspects, the approach of FIG. 4 may be implemented at each retail store, instead of at a single, central location to which are coupled multiple retails stores.

Figure 4:
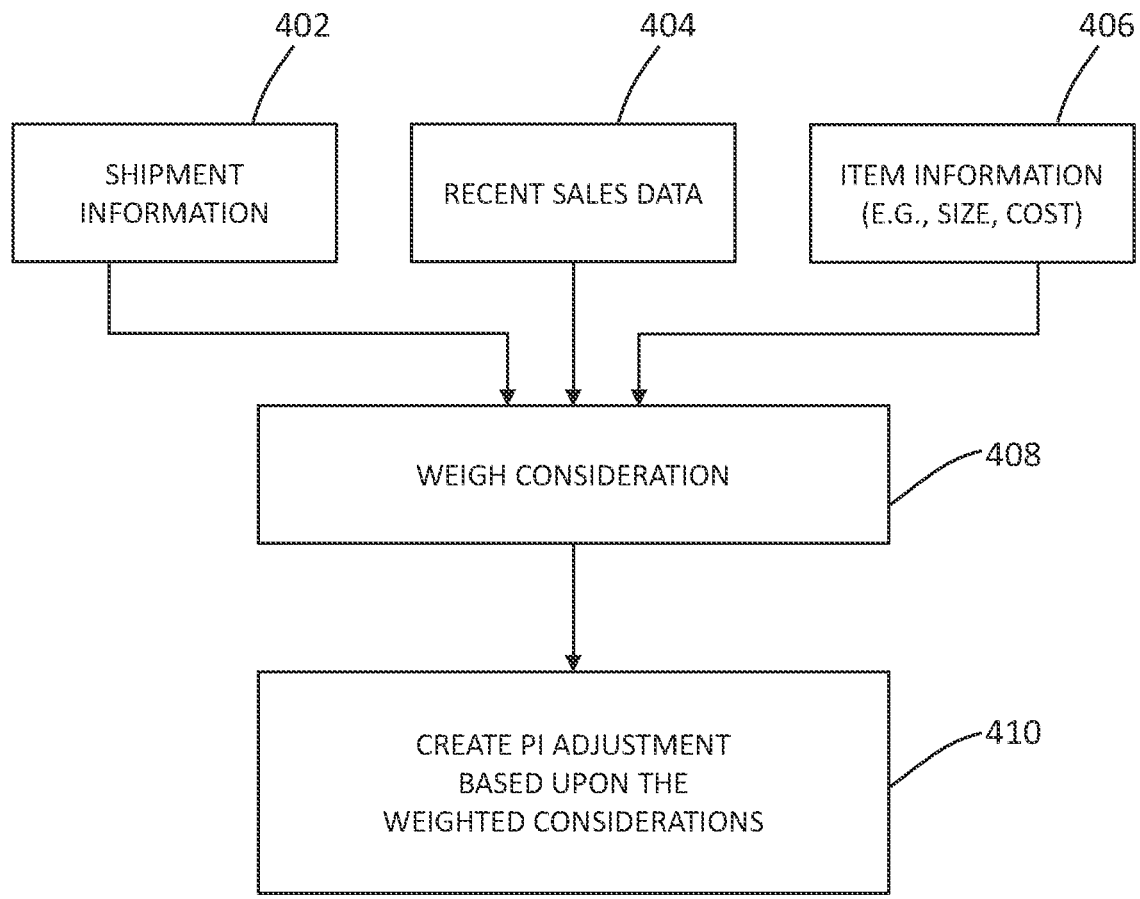
FIG. 4 is a flowchart showing one example of an approach for making a PI adjustment in accordance with some embodiments.

Referring now to FIG. 4, one approach for determining the magnitude and/or sign of a PI adjustment is described. At step 402, shipment information is received, for example, at a central processing center. This information may include when a shipment of the product was received at the retail store, and how much of the product was received in the shipment. At step 404, recent sales data is received, for example, at the central processing center. This data indicates the date and amount of product sold by the store within predefined time periods. At step 406, item information including the size of the product is received, for example, at the central processing center.

At step 408, the considerations are weighted by importance. In aspects, one consideration may be more highly valued than another consideration, and the more highly valued consideration is given a higher weight when the adjustment is calculated. In other cases, all considerations may be equally weighted in importance.

At step 410, a PI adjustment is determined or calculated based upon an analysis of the weighted considerations, and an application of the considerations to the initial PI value. For example, if the shipment information indicates that an amount of product (e.g., greater than a first predetermined threshold) was received, then no PI adjustment is made. In other aspects, when the shipment information indicates that an amount of product (e.g., greater than a second predetermined threshold) was received, the PI is increased by a percentage (e.g., the percentage based upon the amount).

In other examples, the PI may be adjusted downward by a predetermined amount when the product size is greater than some predetermined set of dimensions. In yet other examples, the PI may be adjusted downward by another predetermined amount when the sale amount is zero.

Figure 5:
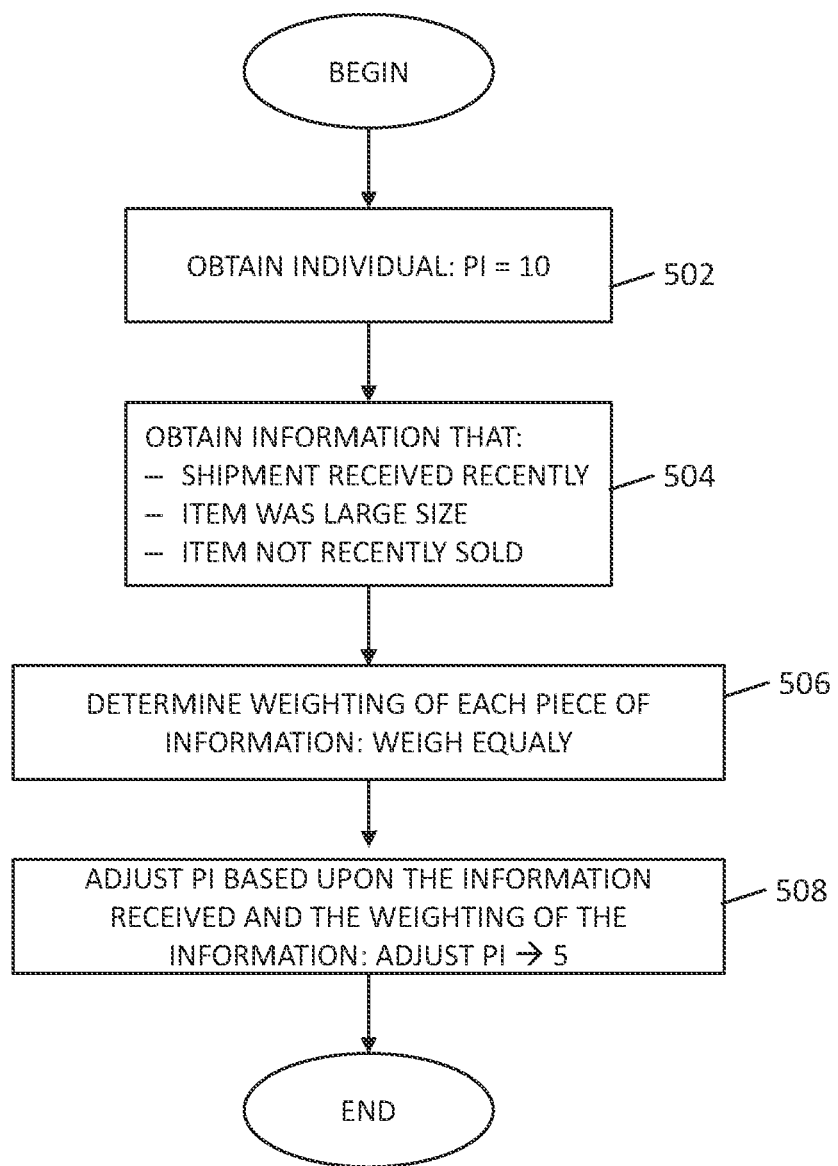
FIG. 5 is a flowchart illustrating one example of application of the example of FIG. 4 in accordance with some embodiments.

Referring now to FIG. 5, one specific example of the application of the algorithm of FIG. 4 is described. A retail store (e.g., a discount center) sells products, and each product has an associated PI value. In aspects, the approach of FIG. 5 may be performed at a central processing center. However, in other aspects, the approach of FIG. 5 may be implemented at each retail store, instead of at a single, central location to which are coupled multiple retails stores.

At step 502, an initial PI value for a product is obtained. In this example, the initial PI value is 10. Thus, the PI value suggests that there are 10 of the product in the store.

Next, various types of information may be obtained and used to determine a PI adjustment. In these regards, at step 504, information is received or obtained that a shipment of the product was recently received at the retail store (e.g., in the last two days), and the amount of product received (e.g., 5). Information is also received or obtained that the product is of large size or dimensions (e.g., 36 inches by 24 inches). Further information (e.g., sales information) is received or obtained that indicate the item was not recently sold to a customer at the retail store (e.g., no sales within the last two days).

In one view, indications that a shipment of the product that recently received at the store and received in significant volume indicates that the item may actually be present at the store and should have a non-zero PI, if this factor is considered in isolation.

On the other hand, the item has a large size or dimensions (e.g., 36 inches by 24 inches), and this may indicate that it would be difficult for a picker to miss the item (e.g., by scans or observation). In other words, a nil pick may indicate that the product is actually not present in the store since the large size would be difficult or impossible to have been missed by the picker. Thus, the PI value for the product should be zero or close to zero if this factor is considered by itself.

Information indicating that the item was not recently sold may also suggest that the item is actually missing from the store. Consequently, the PI value for the product should be zero or close to zero if this factor is considered in isolation.

At step 506, the weight attached to each piece of information is obtained or determined. In some aspects, each weight may be a value between 0 and 1. In this example, the three factors are assumed to each have equal weights (i.e., no one factor is more determinative than any another factor).

At step 508, the PI adjustment is determined. The initial PI value may be used as a starting point and adjustments made by interpreting each of the three factors to adjust the PI. In this example, the starting point for the PI is 10. The first factor (shipping) indicates that the item was recently shipped to the store suggesting that the item is in the store, so no adjustment to the value of 10 is made. If the shipment amount were greater than a certain number (e.g., 100), the PI may actually be increased (the adjustment is greater than 1).

The second factor indicates the item is large in dimensions. Considered alone, this factor indicates the PI should be 0 (or close to zero). However, the first factor (recent shipments) suggested a non-zero PI. Combining the first and second factors results in a downward adjustment to the PI, but not to a zero PI (because the first factor suggests a non-zero PI). In this case and considering factors 1 and 2 only, the PI is adjusted down 50%, to a value of 5 (the total adjustment for the PI is now −5).

The third factor indicates the item was not sold at the store recently. This factor when considered in isolation suggests the PI should be adjusted to zero. However, when consider with the first factor and the second factor, the result is a downward PI adjustment (but not to zero since the first factor suggests product might be available). In this case, the PI is adjusted downward by 3 to a value of 2 (another downward adjustment of 50%). Thus, the overall PI adjustment is −8.

It will be appreciated that this is one example of how a PI may be adjusted and that other approaches are possible. Different results are obtained when other factors are considered and/or when the factors are weighted differently.

Those skilled in the art will recognize that a wide variety of other modifications, alterations, and combinations can also be made with respect to the above described embodiments without departing from the scope of the invention, and that such modifications, alterations, and combinations are to be viewed as being within the ambit of the inventive concept.

What is claimed is:

1. A system that is configured to manage the occurrence of nil picks in a retail store, the system comprising:
    an electronic communication network;
    a retail store coupled to the electronic communication network, the retail store presenting a desired product to customers, and wherein an indication of a nil pick is generated, the nil pick occurring when the desired product is not located in the retail store, the nil pick being generated when an automated device traverses or examines the store and fails to find the desired product, or when a human fails to find the desired product in the retail store;
    a plurality of other retail stores coupled to the electronic communication network;
    a control circuit coupled to the electronic communication network, the control circuit comprising electronic hardware, the control circuit being configured to:
    block an adjustment to a perpetual inventory (PI) value of the desired product when a predetermined event occurs at the retail store, or when information that contradicts the validity of the nil pick is received from the retail store or from the plurality of other retail stores;
    when the adjustment to the PI value of the desired product is not blocked, determine the adjustment based upon one or more of: item information associated with the product, sales data concerning the product at the retail store, supply chain information associated with the desired product, and sales data concerning the desired product at the plurality of other retail stores;
    transmit the adjustment or an adjusted PI to a transceiver at the retail store.

2. The system of claim 1, wherein the retail store includes a backroom, the backroom being inaccessible to customers of the store.

3. The system of claim 2, wherein information that contradicts the validity of the nil pick is data selected from the group consisting of: a back room inventory value that indicates the product exists in the back room of the retail store, and a message from the store indicating the store is aware of the nil pick.

4. The system of claim 1, wherein the item information associated with the product includes data selected from the group consisting of: the cost of the product, physical characteristics of the product, a size of a warehouse pack that includes the product, and the size of a case pack that includes the product.

5. The system of claim 1, wherein the sales data concerning the product includes information selected from the group consisting of: an amount of the product sold and when the product was sold.

6. The system of claim 1, wherein the supply chain information includes information selected from the group consisting of delivery dates for the product, and an amount of the product delivered on the delivery dates.

7. The system of claim 1, wherein the predetermined event is an event selected from the group consisting of: an inventory audit at the retail store, and a lack of sales scan for the product within a predetermined time.

8. The system of claim 1, wherein the control circuit transmits an alert to a store employee when the adjustment to the PI is made.

9. The system of claim 1, wherein the adjusted PI is utilized to re-order products and the products that are re-ordered are physically delivered to the retail store.

10. A method of managing the occurrence of nil picks in a retail store, the method comprising:
providing an electronic communication network;
providing a retail store, the retail store presenting a desired product to customers, the retail store being coupled to the electronic communication network;
providing a plurality of other retail stores that are coupled to the electronic communication network;
at the retail store, generating an indication of a nil pick, the nil pick occurring when the desired product is not located in the retail store, the nil pick being generated when an automated device traverses or examines the store and fails to find the desired product, or when a human fails to find the desired product in the retail store;
at a control circuit, blocking an adjustment to the PI of the desired product when a predetermined event occurs at the retail store, or when information that contradicts the validity of the nil pick is received from the retail store or from the plurality of other retail stores, wherein the control circuit comprises electronic hardware;
by control circuit, when the adjustment to the PI of the desired product is not blocked, determine the adjustment based upon one or more of: item information associated with the product, sales data concerning the product at the retail store, supply chain information associated with the desired product, and sales data concerning the desired product at the plurality of other retail stores;
transmit the adjustment or an adjusted PI to the retail store;
wherein the adjusted PI is utilized to re-order products and the products that are re-ordered are physically delivered to the retail store.

11. The method of claim 10, wherein the retail store includes a backroom, the backroom being inaccessible to customers of the store.

12. The method of claim 11, wherein information that contradicts the validity of the nil pick is data selected from the group consisting of: a back room inventory value that indicates the product exists in the back room of the retail store, and a message from the store indicating the store is aware of the nil pick.

13. The method of claim 10, wherein the item information associated with the product includes data selected from the group consisting of: the cost of the product, physical characteristics of the product, a size of a warehouse pack that includes the product, and the size of a case pack that includes the product.

14. The method of claim 10, wherein the sales data concerning the product includes information selected from the group consisting of: an amount of the product sold and when the product was sold.

15. The method of claim 10, wherein the supply chain information includes information selected from the group consisting of delivery dates for the product, and an amount of the product delivered on the delivery dates.

16. The method of claim 10, wherein the predetermined event is an event selected from the group consisting of: an inventory audit at the retail store, and a lack of sales scan for the product within a predetermined time.

17. The method of claim 10, further comprising transmitting an alert to a store employee when the adjustment to the PI is made.

18. The method of claim 10, wherein the adjusted PI is utilized to re-order products and the products that are re-ordered are physically delivered to the retail store.

* * * * *